US009851654B2

United States Patent
Bryant et al.

(10) Patent No.: US 9,851,654 B2
(45) Date of Patent: Dec. 26, 2017

(54) AUTOMATED LENS CLEANING AND SHUTTER SYSTEM FOR AN ELECTROPHOTOGRAPHIC IMAGING DEVICE

(71) Applicant: Lexmark International, Inc., Lexington, KY (US)

(72) Inventors: Donn Duane Bryant, Lexington, KY (US); Geoffrey Kirk Carlson, Lexington, KY (US); Paul Douglas Horrall, Lexington, KY (US); Gary Scott Overall, Lexington, KY (US); Alan T. Pullins, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/245,962

(22) Filed: Aug. 24, 2016

(65) Prior Publication Data
US 2017/0315467 A1    Nov. 2, 2017

Related U.S. Application Data

(60) Provisional application No. 62/330,431, filed on May 2, 2016.

(51) Int. Cl.
*G03G 15/04* (2006.01)
*B41J 2/44* (2006.01)
*G06K 15/12* (2006.01)

(52) U.S. Cl.
CPC ......... *G03G 15/04036* (2013.01); *B41J 2/44* (2013.01); *G03G 15/04072* (2013.01); *G06K 15/1204* (2013.01); *G03G 2215/0404* (2013.01)

(58) Field of Classification Search
CPC ....... G03G 15/04036; G03G 15/04072; G03G 2215/0402; G03G 2215/0404;
(Continued)

(56) References Cited

U.S. PATENT DOCUMENTS 7,448,726 B2 * 11/2008 Harper ................. B41J 2/16538
  347/29
7,869,101 B2 *  1/2011 Shoji ..................... B41J 2/471
  347/241

(Continued)

FOREIGN PATENT DOCUMENTS

JP    2006276226 A   * 10/2006
JP    2010105342 A   *  5/2010
JP    2011227244 A   * 11/2011

*Primary Examiner* — Robert Beatty

(57) ABSTRACT

An electrophotographic imaging device, including at least one photoconductive member, a printhead unit, at least one shutter-wiper member, and at least one shutter actuator. The at least one shutter-wiper member is moveable in a first direction between a first position in which the shutter-wiper covers the at least one exit lens of the printhead unit and a second position in which the at least one shutter-wiper does not cover the at least one exit lens so as to allow the at least one light beam generated by the printhead unit to pass therethrough. The at least one actuator is coupled to the at least one shutter-wiper member such that movement of the at least one shutter actuator in a second direction substantially orthogonal to the first direction causes the corresponding shutter-wiper member to move in the first direction.

19 Claims, 6 Drawing Sheets

(58) Field of Classification Search
CPC .............. G06K 15/1204; G02B 23/16; G02B 27/0006; B41J 2/44; B41J 2/442
USPC ..... 399/4, 118, 207, 218; 359/511; 347/118, 347/119, 136, 241, 256
See application file for complete search history.

(56) References Cited

U.S. PATENT DOCUMENTS

| | | | | |
|---|---|---|---|---|
| 8,081,200 | B2* | 12/2011 | Yamada | G03G 15/326 347/130 |
| 8,918,009 | B2* | 12/2014 | Lee | G03G 15/0435 347/241 |
| 9,606,501 | B2* | 3/2017 | Sakamoto | G03G 21/1604 |
| 2005/0243156 | A1* | 11/2005 | Matsutomo | G03G 15/04045 347/136 |
| 2007/0070173 | A1* | 3/2007 | Yamakawa | B41J 2/471 347/241 |
| 2008/0025747 | A1* | 1/2008 | Lim | G02B 7/1821 399/71 |

* cited by examiner

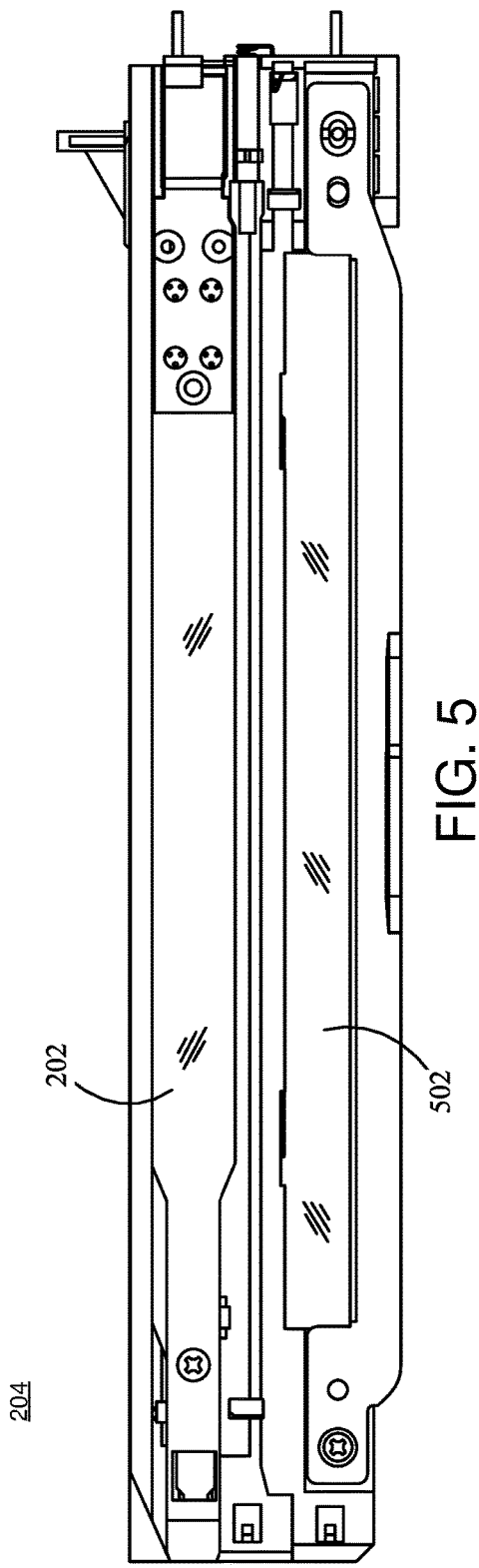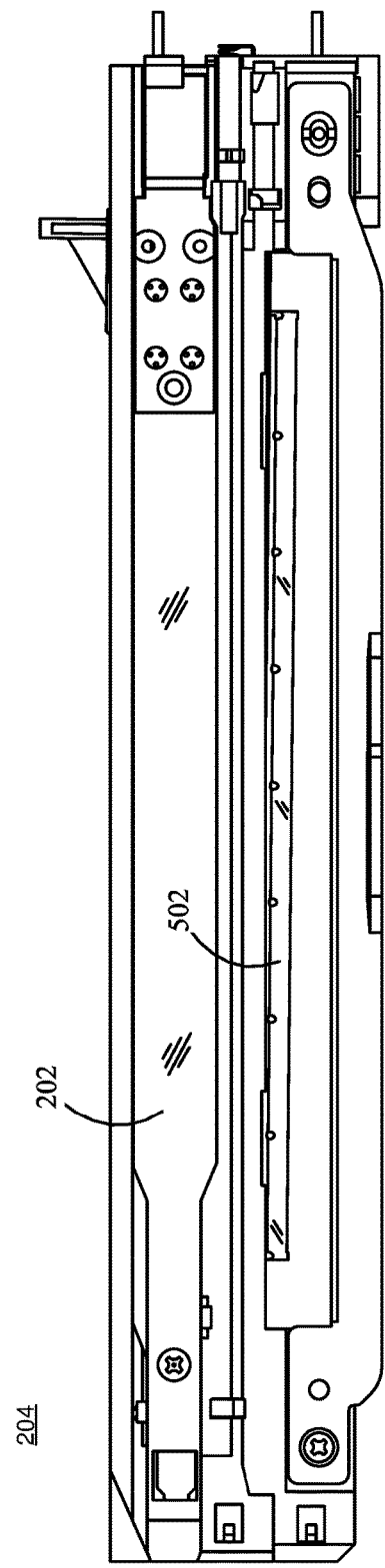

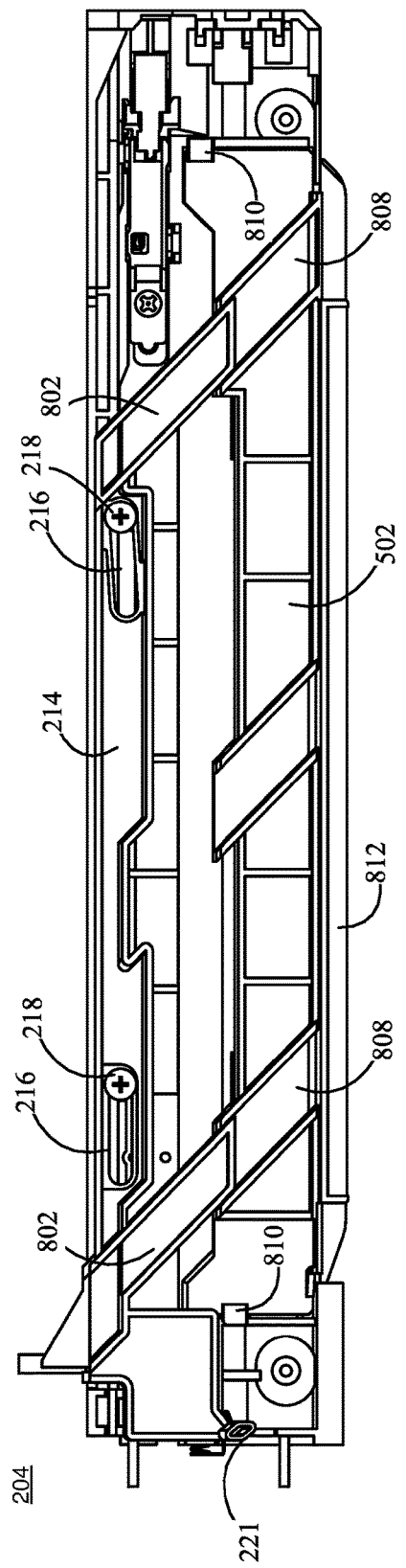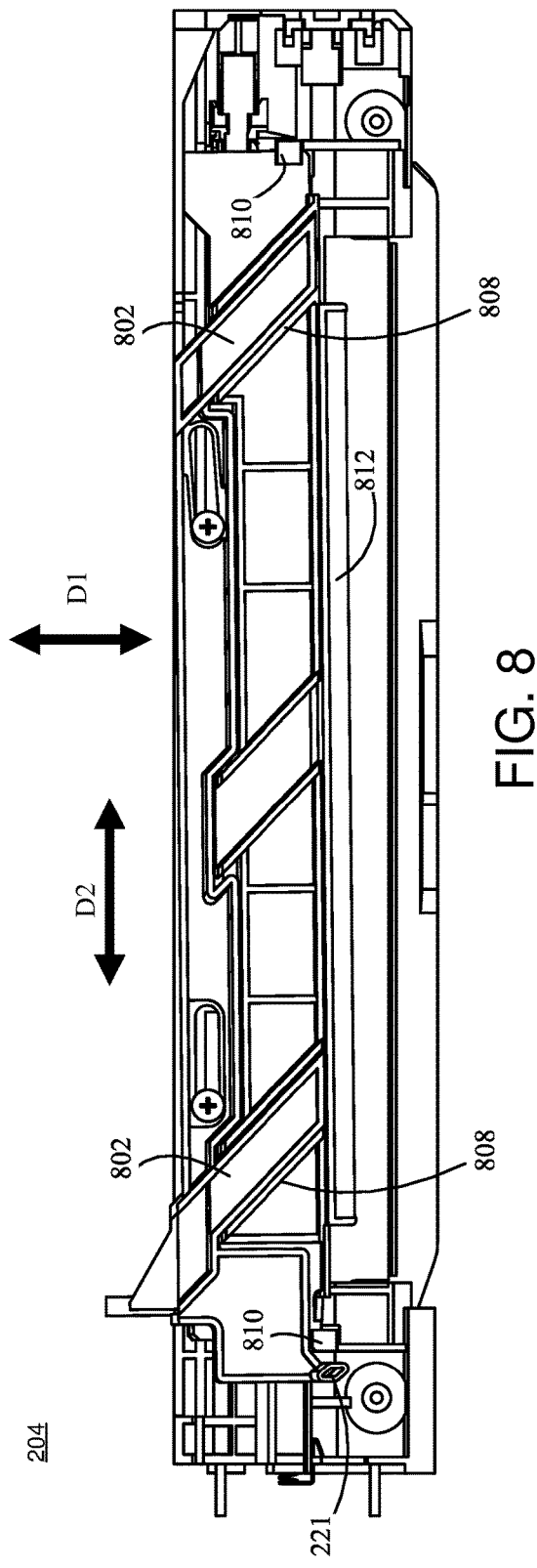

AUTOMATED LENS CLEANING AND SHUTTER SYSTEM FOR AN ELECTROPHOTOGRAPHIC IMAGING DEVICE

CROSS REFERENCES TO RELATED APPLICATIONS

This application claims priority to U.S. provisional patent application No. 62/330,431, titled "Automated Lens Cleaning and Shutter System for an Electrophotographic Imaging Device", and filed on May 2, 2016, the contents of which are hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to control in an electrophotographic (EP) imaging device, and particularly to an apparatus for more effectively and efficiently cleaning printhead and sensor lenses in an imaging device.

2. Description of the Related Art

Color EP imaging devices typically focus laser beams onto four photoconductive drums (PCDs). The laser beams are generated and directed to the PCDs by the imaging device's printhead. The last optical element the laser beam passes through when exiting the housing of the printhead is often a clear (transparent) lens used to insure contaminants do not enter into the printhead housing and settle on any of the optical elements therein. If toner or paper dust, for example, accumulates on the clear lens, the optical power of the laser beam passing through the clear lens is diminished. This optical power reduction adversely affects print quality.

In addition, color EP imaging devices utilize a toner patch sensor (TPS) to maintain proper toner density developed on the PCDs and the intermediate transfer member (ITM) of the imaging device. A TPS reflects light from a toned patch (formed on a PCD or ITM) and senses the reflected light for use in determining if a sufficient amount of toner has been deposited. The TPS typically uses a clear lens to protect its inner optical surfaces from contamination. Similar to the printhead protective lens, if contaminants accumulate on the lens surface of the TPS, signal integrity of the TPS will be diminished. This also results in diminished print quality.

Many existing systems require manual operator intervention to clean the printhead protective lens and the TPS lens. Requiring operator intervention to initiate a cleaning cycle often results in irregular cleaning of the lenses. Also, in some imaging devices, the printhead is positioned beneath the developer units. This positioning makes leakage of toner onto the printhead more probable during withdrawal and insertion of a developer unit.

Based upon the foregoing, there is a need for an improved printhead and sensor lens cleaning system in an EP imaging device.

SUMMARY

Embodiments of the present disclosure provide an automated and integrated lens cleaning and shutter system which overcomes or at least mitigates the issues described above.

In an example embodiment, an imaging device includes at least one photoconductive member, a printhead unit, at least one shutter-wiper member, and at least one shutter actuator. The printhead unit generates at least one light beam, the at least one light beam being incident upon the at least one photoconductive member during a printing operation by the imaging device. The printhead unit further includes at least one exit lens through which the at least one light beam passes before being incident upon the at least one photoconductive member and defining areas of the at least one photoconductive member on which toner develops during the printing operation. The at least one shutter-wiper member is moveable in a first direction between a first position in which the shutter-wiper member is positioned over and otherwise covers the at least one exit lens and a second position in which the at least one shutter-wiper member does not cover the at least one exit lens so as to allow the at least one light beam to pass therethrough. The shutter-wiper member includes a wiper and/or brush for clearing particles from the at least one exit lens as the shutter-wiper member moves across the at least one exit lens in the first direction. The at least one actuator is coupled to the at least one shutter-wiper member such that movement of the at least one shutter actuator in a second direction substantially orthogonal to the first direction causes the corresponding shutter-wiper member to move in the first direction. In this way, moving the at least one shutter actuator causes movement of the at least one shutter-wiper member between covering and protecting the at least one exit lens (in the first position) and allowing for a light beam to pass therethrough (in the second position) for facilitating a printing operation, which also cleans the lens.

In another example embodiment, an imaging device includes at least one photoconductive member, at least one developer unit, a printhead unit, at least one shutter-wiper member, a motion distribution link, and at least one shutter actuator. The developer unit is adjacent to and cooperates with the at least one photoconductive member to develop toner thereon during a printing operation. The printhead unit generates at least one light beam, the at least one light beam being incident upon the at least one photoconductive member during a printing operation of the imaging device. The printhead unit further includes at least one exit lens through which the at least one light beam passes before being incident upon the at least one photoconductive member and defining areas of the at least one photoconductive member on which toner develops during the printing operation. The at least one shutter-wiper member is moveable in a first direction between a first position in which the at least one shutter-wiper member is positioned over and otherwise covers the at least one exit lens and a second position in which the at least one shutter-wiper member does not cover the at least one exit lens so as to allow the at least one light beam to pass through the at least one exit lens. The shutter-wiper member includes a wiper and/or brush for clearing particles from the at least one exit lens as the shutter-wiper member moves across the at least one exit lens in the first direction. The motion distribution link is disposed in the imaging device and moveable in the first direction within the imaging device. The at least one shutter actuator is coupled between the motion distribution link and the at least one shutter-wiper member, such that movement of the motion distribution link in the first direction causes the at least one shutter actuator to move in a second direction in the imaging device generally orthogonal to the first direction, which causes the at least one shutter-wiper member to move between the first and second positions relative to the at least one exit lens of the printhead.

In another example embodiment, an imaging device includes a plurality of photoconductive members, a plurality of developer units, a printhead unit, a plurality of shutter-wiper members, a plurality of shutter-actuators, at least one sensor having a protective lens, a wiper housing, and a wiper arm. Each developer unit of the plurality of developer units is adjacent to and cooperates with a corresponding photoconductive member of the plurality of photoconductive members. The printhead unit generates a plurality of light beams, each light beam being incident upon a photoconductive member during a printing operation of the imaging device. The printhead unit further includes a plurality of exit lenses through which the plurality of light beams pass before being incident upon the photoconductive members and defining areas of the photoconductive members on which toner develops during the printing operation. Each of the shutter-wiper members of the plurality of shutter-wiper members is moveable in a first direction between a first position in which the shutter-wiper member is positioned over and covers a corresponding exit lens and a second position in which the shutter-wiper member is positioned away from and does not cover the corresponding exit lens so as to allow the at least one light beam to pass through the exit lens. Each shutter-wiper member includes a wiper and/or brush for clearing particles from the corresponding exit lens as the shutter-wiper member moves across the exit lens in the first direction. Each shutter actuator of the plurality of shutter actuators is coupled to a corresponding shutter-wiper member, such that movement of the shutter actuator in a second direction orthogonal to the first direction causes the corresponding shutter-wiper member to move in the first direction. The wiper housing includes at least one wiper and is configured to move in the second direction. The wiper arm is coupled between one of the shutter actuators and the wiper housing, the wiper arm pivoting in response to movement of the one of the shutter actuators so as to move the at least one wiper relative to the protective lens of the at least one sensor so as to clean and protect same.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein:

FIGS. 5 and 6 are top plan views of the shutter wiper assembly of FIG. 2 according to an example embodiment.

FIGS. 7 and 8 are bottom plan views of the shutter wiper assembly of FIG. 2 according to an example embodiment.

DETAILED DESCRIPTION

Figure 1:
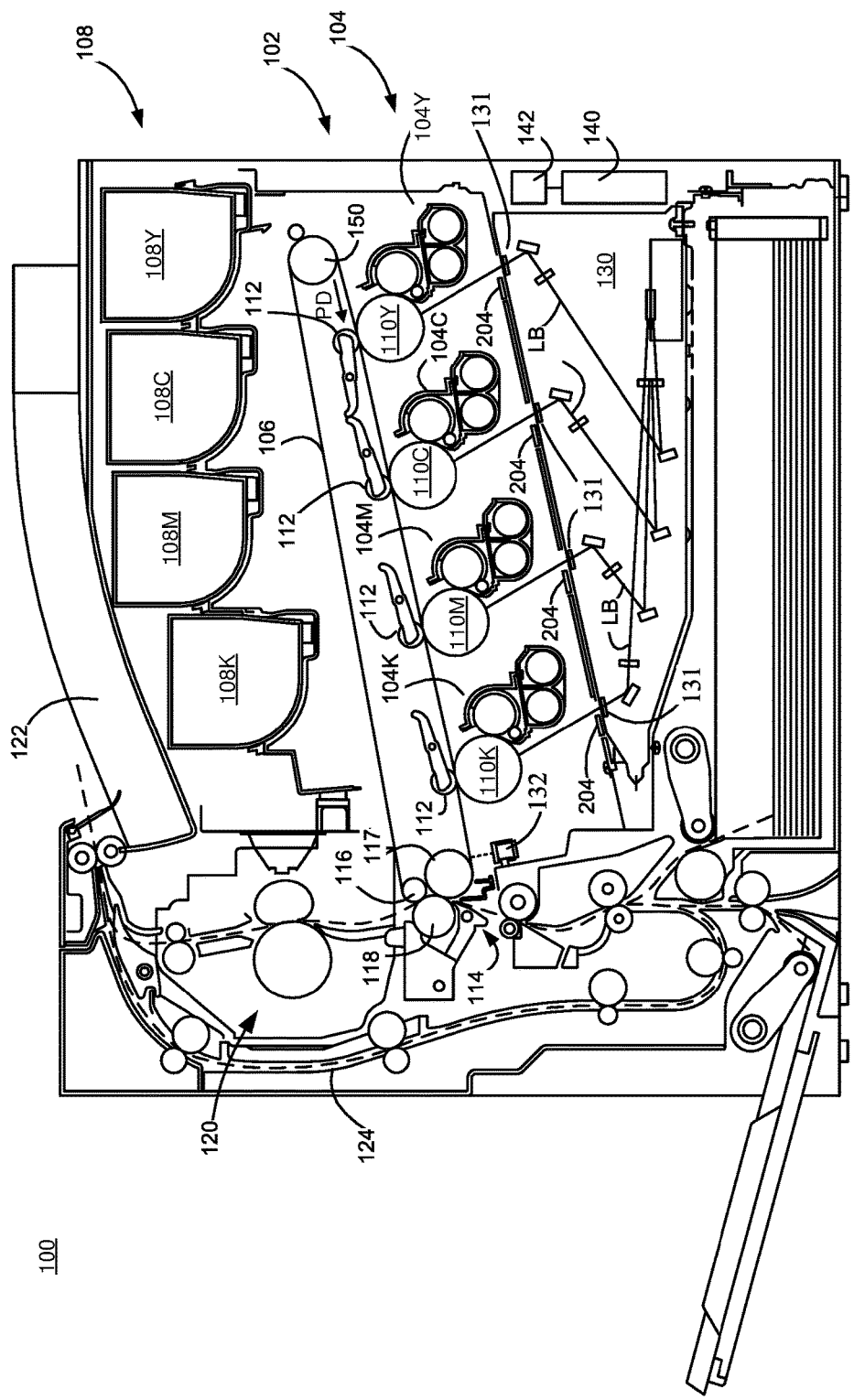
FIG. 1 is a side elevational view of an electrophotographic imaging device according to an example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and positionings. In addition, the terms "connected" and "coupled" and variations thereof are not restricted to physical or mechanical connections or couplings.

Spatially relative terms such as "top", "bottom", "front", "back" and "side", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

FIG. 1 illustrates a color imaging device 100 according to an example embodiment. Imaging device 100 includes a first toner transfer area 102 having four developer units 104Y, 104C, 104M and 104K that substantially extend from one end of imaging device 100 to an opposed end thereof. Developer units 104 are disposed along an intermediate transfer member (ITM) 106. Each developer unit 104 holds a different color toner. The developer units 104 may be aligned in order relative to a process direction PD of the ITM belt 106, with the yellow developer unit 104Y being the most upstream, followed by cyan developer unit 104C, magenta developer unit 104M, and black developer unit 104K being the most downstream along ITM belt 106.

Each developer unit 104 is operably connected to a toner reservoir 108 for receiving toner for use in a printing operation. Each toner reservoir 108Y, 108C, 108M and 108K is controlled to supply toner as needed to its corresponding developer unit 104. Each developer unit 104 is associated with a photoconductive member 110Y, 110C, 110M and 110K that receives toner therefrom during toner development in order to form a toned image thereon. Each photoconductive member 110 is paired with a transfer member 112 for use in transferring toner to ITM belt 106 at first transfer area 102.

During color image formation, the surface of each photoconductive member 110 is charged to a specified voltage, such as −800 volts, for example. At least one laser beam LB from a printhead or laser scanning unit (LSU) 130 is directed to the surface of each photoconductive member 110 and discharges those areas it contacts to form a latent image thereon. In one embodiment, areas on the photoconductive member 110 illuminated by the laser beam LB are discharged to approximately −100 volts. The developer unit 104 then transfers toner to photoconductive member 110 to form a toner image thereon. The toner is attracted to the areas of the surface of photoconductive member 110 that are discharged by the laser beam LB from LSU 130.

ITM belt 106 is disposed adjacent to each of developer unit 104. In this embodiment, ITM belt 106 is formed as an endless belt disposed about a backup roll 116, a drive roll 117 and a tension roll 150. During image forming or imaging operations, ITM belt 106 moves past photoconductive members 110 in process direction PD as viewed in FIG. 1. One or more of photoconductive members 110 applies its toner image in its respective color to ITM belt 106. For mono-color images, a toner image is applied from a single photoconductive member 110K. For multi-color images, toner images are applied from two or more photoconductive members 110. In one embodiment, a positive voltage field formed in part by transfer member 112 attracts the toner image from the associated photoconductive member 110 to the surface of moving ITM belt 106.

ITM belt 106 rotates and collects the one or more toner images from the one or more developer units 104 and then conveys the one or more toner images to a media sheet at a second transfer area 114. Second transfer area 114 includes a second transfer nip formed between back-up roll 116, drive roll 117 and a second transfer roller 118. Tension roll 150 is disposed at an opposite end of ITM belt 106 and provides suitable tension thereto.

Fuser assembly 120 is disposed downstream of second transfer area 114 and receives media sheets with the unfused toner images superposed thereon. In general terms, fuser assembly 120 applies heat and pressure to the media sheets in order to fuse toner thereto. After leaving fuser assembly 120, a media sheet is either deposited into output media area 122 or enters duplex media path 124 for transport to second transfer area 114 for imaging on a second surface of the media sheet.

Imaging device 100 is depicted in FIG. 1 as a color laser printer in which toner is transferred to a media sheet in a two-step operation. Alternatively, imaging device 100 may be a color laser printer in which toner is transferred to a media sheet in a single-step process—from photoconductive members 110 directly to a media sheet. In another alternative embodiment, imaging device 100 may be a monochrome laser printer which utilizes only a single developer unit 104 and photoconductive member 110 for depositing black toner directly to media sheets. Further, imaging device 100 may be part of a multi-function product having, among other things, an image scanner for scanning printed sheets.

Imaging device 100 further includes a controller 140 and memory 142 communicatively coupled thereto. Though not shown in FIG. 1, controller 140 may be coupled to components and modules in imaging device 100 for controlling same. For instance, controller 140 may be coupled to toner reservoirs 108, developer units 104, photoconductive members 110, fuser assembly 120 and/or LSU 130 as well as to motors (not shown) for imparting motion thereto. It is understood that controller 140 may be implemented as any number of controllers and/or processors for suitably controlling imaging device 100 to perform, among other functions, printing operations.

For purposes of the description below, the front of imaging device 100 is on the left side of FIG. 1, and the back or rear of imaging device 100 is on the right side of FIG. 1. Movement in the front-to-back direction and back-to-front direction then refers to movement in the left-to-right and right-to-left directions, respectively, as viewed in FIG. 1.

In the example embodiments, printhead 130 generates and focuses beams of light onto photoconductive members 110. Printhead 130 includes four exit lenses and/or exit windows 131 through which the four light beams pass before reaching photoconductive members 110. It is understood that reference 131 may refer to either exit lenses and/or exit windows and that the exit lenses and/or windows may or may not optically alter the light beams passing therethrough. For purposes of simplicity, the exit lenses and/or windows 131 will be hereinafter referred to as "exit lenses 131" or "lenses 131." Imaging device 100 further includes TPS 132 which, in this case, is used to sense the reflectivity of a toner patch disposed on ITM 106. It is understood that in addition or in the alternative, a TPS may be associated with each photoconductive member 110 for use in detecting the amount of toner reflected from a toner patch deposited on photoconductive member 110. Imaging device 100 further includes a pair of registration sensors 133 which are disposed in proximity to TPS 132. In an example embodiment, each of TPS 132 and registration sensors 133 includes a lens or window (hereinafter "lens") which serves to protect the sensor from contaminants. Similar to lenses 131 above, the lenses for TPS 132 and registration sensors 133 may or may not optically alter light beams passing therethrough.

Example embodiments include a cleaning and shutter mechanism for automatically cleaning lenses 131 of printhead 130 and the lenses associated with TPS 132 and registration sensors 133. The mechanism also protects lenses 131 of printhead 130 during selected times when a greater number of contaminants may be generated in imaging device 100 which could potentially be deposited on lenses 131. The mechanism includes hardware and firmware for controlling the hardware. The hardware of the cleaning and shutter mechanism is largely depicted in FIGS. 2-8.

Figure 2:
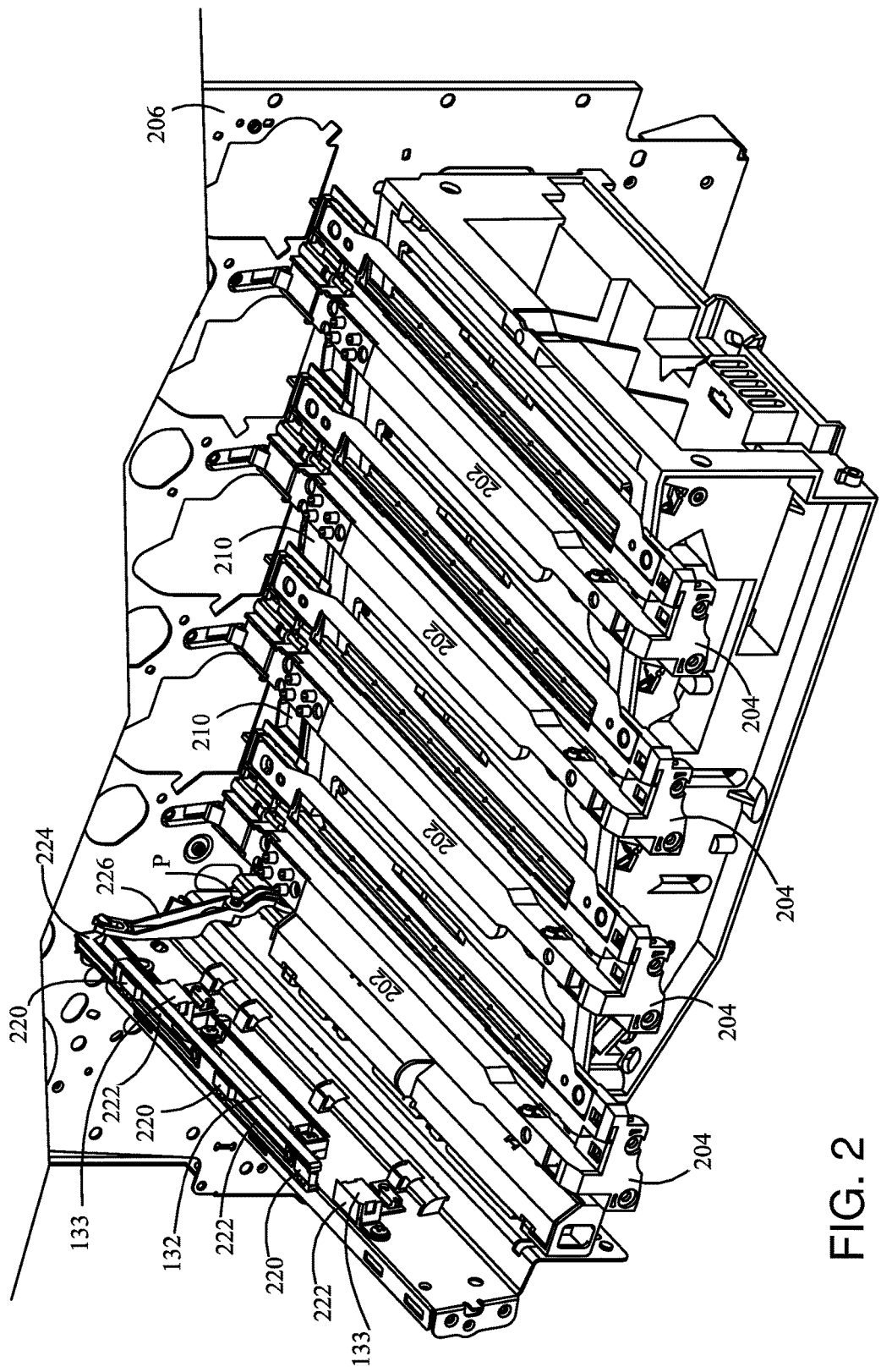
FIG. 2 is a top perspective view of a portion of a lens cleaning and shutter system of the electrophotographic imaging device of FIG. 1 according to an example embodiment.

In FIG. 2, developer units 104 and printhead 130 have been removed from imaging device 100, in addition to other components, in order to more clearly see the cleaning and shutter mechanism for cleaning and protecting lenses 131 of printhead 130 and lenses 222 associated with TPS 132 and registration sensors 133. As shown, four loading rails 202 are disposed laterally across imaging device 100, between opposed side frames 206 thereof. Loading rails 202 are adapted to engage developer units 104. Developer units 104 are slidingly inserted from a side of imaging device 100 along loading rails 202.

In the example embodiment, the cleaning and shutter mechanism includes four shutter-wiper assemblies 204. As shown in FIG. 1, each shutter-wiper assembly 204 is positioned over a lens 131 of printhead 130. Loading rails 202 form part of the shutter-wiper assemblies 204 of the cleaning and shutter mechanism. The loading rails 202 forming part of the shutter-wiper assemblies 204 eliminate the need to introduce additional mounting or referencing assemblies and components for the shutter-wiper assemblies 204, thereby reducing the additional space required by the shutter-wiper assemblies 204 within imaging device 100. The mechanism further includes a wiper housing 224 which extends laterally across imaging device 100 and includes wiper pads 220 for cleaning lenses 222 of TPS 132 and registration sensors 133.

The cleaning and shutter mechanism further includes motion distribution link 210. As partly shown in FIGS. 2-4, motion distribution link 210 extends front-to-back in imaging device 100, along a side frame 206. Motion distribution link 210 is coupled to each shutter-wiper assembly 204 and to wiper housing 224 for imparting motion to each. Motion distribution link 210 is translatable in the front-to-back and back-to-front directions D1 (FIG. 3) within imaging device 100. Translation of motion distribution link 210 activates each shutter-wiper assembly 204 to clean its corresponding lens 131 of printhead 130, and to move a shutter of shutter-wiper assembly 204 to cover and protect lens 131 or uncover lens 131 for imaging. Translation of motion distribution link 210 additionally causes translation of wiper housing 224 to clean TPS 132 and registration sensors 133, as explained in greater detail below.

Figure 3:
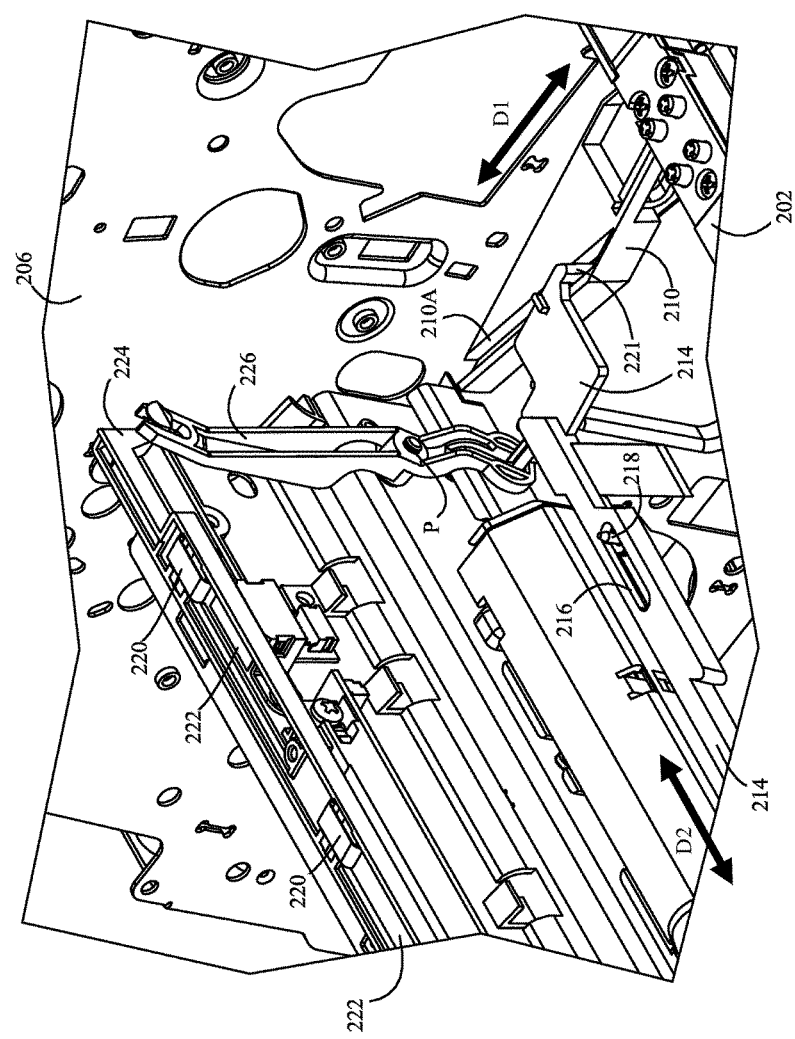
FIG. 3 is a perspective view of a motion generating portion of the lens cleaning and shutter system of the EP imaging device of FIG. 1 according to an example embodiment.

FIG. 3 illustrates the couplings to motion distribution link 210. Specifically, FIG. 3 shows an end portion of motion distribution link 210 having cam drive surface 210A. In FIG. 3, loading rail 202 is removed from shutter-wiper assembly 204 for clarity. In the illustrated example embodiment, cam drive surface 210A is a groove defined in motion distribution link 210 that is angled relative to the front-to-back and back-to-front direction D1 of motion distribution link 210. Motion distribution link 210 includes an angled cam drive surface 210A for each shutter-wiper assembly 204 for engagement therewith.

Each shutter-wiper assembly 204 includes a shutter actuator 214 which extends between side frames 206 of imaging device 100. Shutter actuator 214 includes a plurality of slots 216, with each slot 216 having a stationary pin 218 disposed therein. This allows shutter actuator 214 to move in a side-to-side direction D2 relative within imaging device 100. Side-to-side direction D2 is orthogonal to front-to-back and back-to-front direction D1, according to an example embodiment. Shutter actuator 214 further includes a cam follower 221 which is disposed in cam drive surface 210A and slidingly engaged therewith. When motion distribution link 210 moves in front-to-back or back-to-front direction D1, cam follower 221 is caused to slide in cam drive surface 210A which results in shutter actuator 214 moving in side-to-side direction D2.

TPS wiper housing 224 extends largely between opposed side frames 206 and includes wipers 220 disposed therein. TPS wiper housing 224 further includes one or more slots having a stationary pin or screw disposed therein for limiting movement of TPS wiper housing 224 to side-to-side direction D2. Wipers 220 are disposed along TPS wiper housing 224 such that movement of TPS wiper housing 224 in the side-to-side direction D2 causes wipers 220 to wipe and thus clean lenses 222 associated with TPS 132 and registration sensors 133. As shown in FIGS. 2 and 3, TPS wiper housing 224 is disposed in an elevated position relative to motion distribution link 210 and shutter wiper assemblies 204.

With continued reference to FIG. 3, the cleaning mechanism also includes wiper pivot arm 226 which couples motion distribution link 210 with TPS wiper housing 224. Specifically, wiper pivot arm 226 is pivotally coupled to the frame of imaging device 100 at pivot point P. A first longitudinal (forked) end of wiper pivot arm 226 is coupled to the front-most shutter actuator 214 (via a post thereof) and a second longitudinal (forked) end of wiper arm 226 is coupled to TPS wiper housing 224 (via a post thereof). In this way, movement of the front-most actuator 214 in side-to-side direction D2 causes wiper pivot arm 226 to pivot about pivot point P which causes TPS wiper housing 224 to move in side-to-side direction D2, for wiping lenses 222 of TPS 132 and registration sensors 133.

Figure 4:
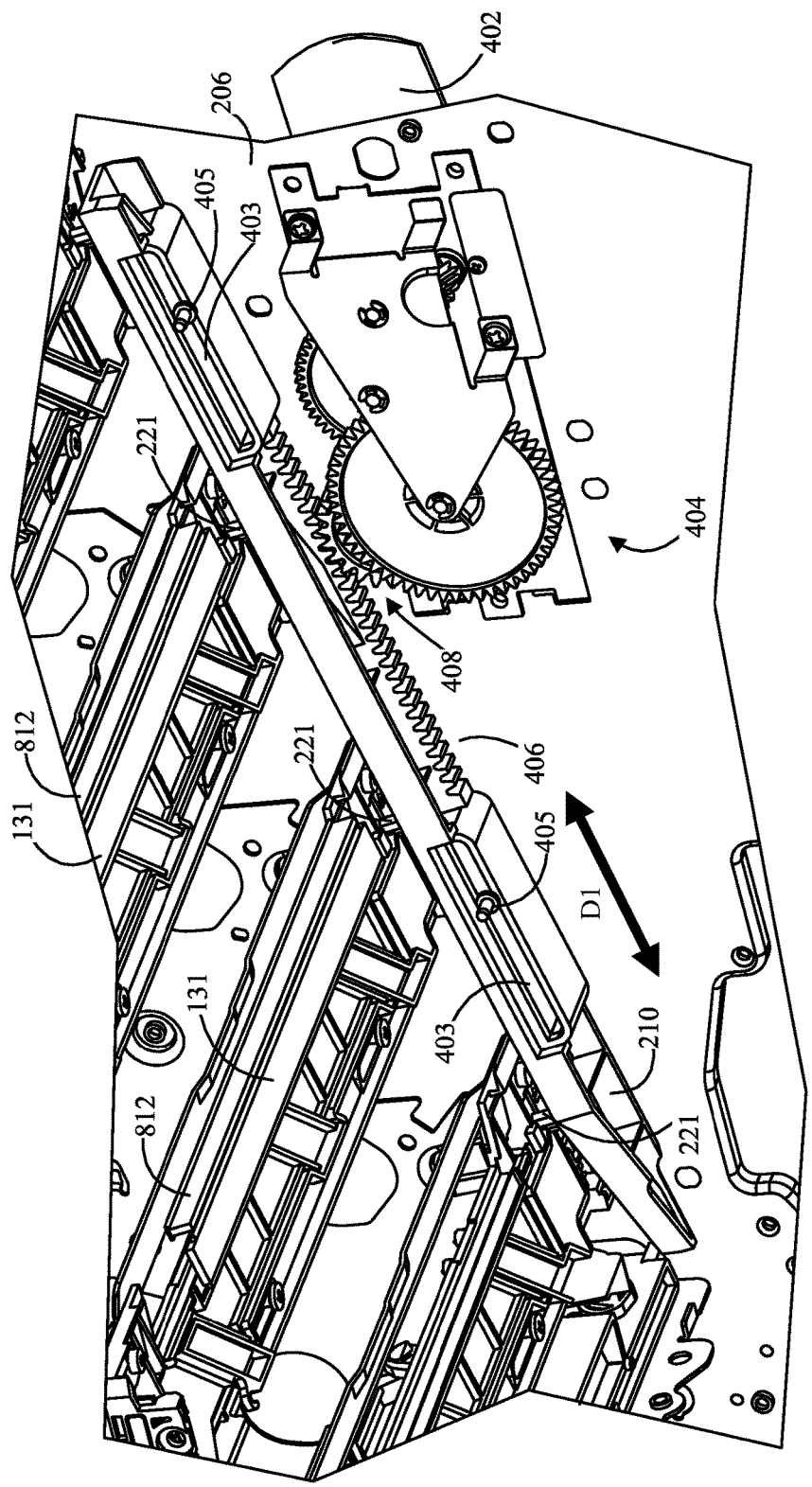
FIG. 4 is a bottom perspective view of a portion of the lens cleaning and shutter system of FIG. 2 according to an example embodiment.

FIG. 4 illustrates the drive assembly forming part of, or coupled to, the cleaning and shutter mechanism. Motor 402 is mounted along an outside surface of device frame 206. Gear assembly 404 is mounted to side frame 206, coupled to motor 402 and includes a plurality of gears. Motion distribution link 210, which includes a plurality of slots 403 in which stationary pins 405 are disposed there for limiting movement of motion distribution link 210 in the front-to-back and back-to-front direction D1, also includes a rack 406 disposed along an underside of motion distribution link 210. Pinion gear 408 of gear assembly 404 engages with rack 406 of motion distribution link 210. In this way, activation of motor 402 causes pinion gear 408 to rotate which causes motion distribution link 210 to move in front-to-back and back-to-front direction D1.

FIGS. 5-8 illustrate the shutter-wiper assembly 204, with FIGS. 5 and 6 depicting shutter-wiper assembly 204 from a top view and FIGS. 7 and 8 depicting same from a bottom view. Loading rail 202 is disposed along the top of shutter-wiper assembly 204 and extends in the longitudinal direction thereof. A shutter-wiper 502 is slidingly coupled to both loading rail 202 and shutter actuator 214. Shutter-wiper 502 is movable between a first (closed) position (FIG. 5) in which shutter-wiper 502 is positioned over and otherwise covers a corresponding lens 131 of printhead 130 so as to protect lens 131 from contaminants collecting thereon; and a second (open) position (FIG. 6) in which shutter-wiper 502 does not cover lens 131 so that printhead 130 may be used in a printing operation (to generate light beams that are incident on photoconductive members 110 to create a latent image). Shutter-wiper 502 is moved between the first and second positions through movement of motion distribution link 210 and shutter actuator 214, as explained in greater detail below.

In an example embodiment, each of shutter actuator 214 and shutter-wiper 502 is constructed of a relatively sturdy plastic.

FIG. 7 illustrates a bottom view of shutter-wiper assembly 204 with shutter-wiper 502 in the first (closed) position which covers lens 131 of printhead 130, and FIG. 8 illustrates a bottom view of shutter-wiper assembly 204 with shutter-wiper 502 in the second (open) position in which lens 131 is uncovered. As explained above, shutter actuator 214 includes slots 216 in which stationary pins 218 are disposed, for limiting movement of shutter actuator 214 in the side-to-side direction D2 based upon cam follower 221 engaging with a cam drive surface 210A of motion distribution link 210. Shutter actuator 214 further includes protrusions 802 which protrude from a longitudinal axis thereof. Each protrusion 802 is disposed at an angle relative to the longitudinal axis of shutter actuator 214. In an example embodiment, the angle is between about 35 and about 55 degrees from the longitudinal axis, such as about 45 degrees.

Shutter-wiper 502 includes slots 808 which are defined along the underside of shutter-wiper 502. Each slot 808 is disposed at an angle relative to the longitudinal axis of shutter-wiper 502. In the example embodiment, the angle is the same angle of or a complementary angle (e.g., 180 degrees apart, when shutter-wiper 502 is arranged and coupled to shutter actuator 214 and loading rail 202) to protrusions 802. Each slot 808 is disposed in proximity with a corresponding protrusion 802 to slidingly engage therewith. Loading rail 202 includes tabs 810 disposed along loading rail 202 in proximity with longitudinal ends of shutter-wiper 502. Each tab 810 is substantially L-shaped and extends downwardly from a main bottom surface portion of loading rail 202 so as to form a groove therewith. The grooves formed by tabs 810 receive the longitudinal ends of shutter-wiper 502 which thereby limit the movement of shutter-wiper 502 to (front-to-back) direction D1.

Specifically, protrusions 802 slidingly engage with slots 808. When shutter actuator 214 is caused to move in side-to-side direction D2 due to movement of motion distribution link 210 and the engagement of cam follower 221 therewith, protrusions 802 cause slots 808 to move due to the sliding engagement between protrusions 802 and slots 808. For example, if shutter actuator 214 moves in the left-to-right direction (relative to the view of FIG. 7) while shutter-wiper 502 is in the first (closed) position as shown in FIG. 7 in which shutter-wiper 502 covers printhead lens 131, such left-to-right movement of protrusions 802 urge slots 808 to move and otherwise slidingly engage therewith. Because shutter-wiper 502 is limited to movement in direction D1, movement of shutter-wiper 502 is in the down-to-up direction, as viewed from FIG. 7. The down-to-up movement of shutter-wiper 502 is completed when protrusions 802 are substantially fully inserted within slots 808, as shown in FIG. 8, which is the second (open) position for allowing printhead 130 to operate in a printing operation.

If shutter actuator 214 moves in the right-to-left direction while shutter-wiper 502 is in the second (open) position as shown in FIG. 8, movement of protrusions 802 urges slots 808 to move and otherwise sliding engage therewith. Because shutter-wiper 502 is limited to movement in direction D1, movement of shutter-wiper 502 is in the up-to-down direction, as viewed from FIG. 8. The up-to-down movement of shutter-wiper 502 is completed when protrusions 802 are nearly but not fully removed from slots 808, as shown in FIG. 7, which is the first (closed) position for protecting printhead lens 131 from falling toner and other contaminants.

Shutter-wiper 502 further includes a brush 812 that extends in the longitudinal direction thereof. Brush 812 is disposed so that movement of shutter-wiper 502 from the first (closed) position to the second (open) position, and from the second (open) position to the first (closed) position results in brush 812 sweeping across printhead lens 131 so as to remove contaminants from and otherwise clean same.

It is understood that in another example embodiment, each shutter actuator 214 includes an angled slot 808 and each shutter-wiper 502 includes an angled protrusion 802 which engages with the corresponding angled slot 808.

The operation of the cleaning and shutter mechanism will be described with respect to FIGS. 2-8. Initially, it is assumed that each shutter-wiper 502 is in the second (open) position, lenses 222 of TPS 132 and registration sensors 133 are uncovered, and motion distribution link 210 is in its most-forward position relative to the front of imaging device 100. Activation of motor 402 in a first direction causes motion distribution link 210 to move in the front-to-back direction D1, which causes each shutter actuator 214 to move in side-to-side direction D2 towards the side frame 206 depicted in FIGS. 2 and 3. Such movement of the front-most shutter actuator 214 causes wiper pivot arm 226 to pivot and/or rotate in the counter-clockwise direction (as viewed from FIG. 3), which causes wiper housing 224 to move in side-to-side direction D2 away from the side frame 206 depicted in FIGS. 2 and 3. Such movement of wiper housing 224 results in wipers 220 passing over and cleaning lenses 222 of TPS 132 and registration sensors 133. At the completion of movement of wiper housing 224 in such side-to-side direction D2, wipers 220 are positioned over and thus protect lenses 222, according to an example embodiment. In another example embodiment, wipers 220 are partly positioned over lenses 222 at the completion of movement of wiper housing 224.

The above-described movement of each shutter actuator 214 in side-to-side direction D2 (towards the illustrated side frame 206) causes the corresponding shutter-wiper 502 to move in direction D1, and in particular up-to-down direction D1 as viewed in FIGS. 7 and 8), which moves shutter-wiper 502 from the second (open) position to the first (closed) position. When shutter-wipers 502 are moved to the first (closed) position, shutter-wiper 502 sweeps lenses 131 from contaminants (via brush 812) and protects lenses 131 from being deposited thereon. In this position, lenses 131 are cleaned and protected, and lenses 222 are also cleaned (from wipers 220 being moved thereover) and protected (from wipers 220 being disposed over at least part of lenses 222).

Now, assume each shutter-wiper 502 is in the first (closed) position, lenses 222 of TPS 132 and registration sensors 133 are covered by wipers 220, and motion distribution link 210 is in its most-backward position relative to the back of imaging device 100. Activation of motor 402 in a second direction causes motion distribution link 210 to move in the back-to-front direction D1, which causes each shutter actuator 214 to move in side-to-side direction D2 away from the side frame 206 depicted in FIGS. 2 and 3. Such movement of the front-most shutter actuator 214 causes wiper pivot arm 226 to pivot and/or rotate in the clockwise direction (as viewed from FIG. 3), which causes wiper housing 224 to move in side-to-side direction D2 towards the side frame 206 depicted in FIGS. 2 and 3. Such movement of wiper housing 224 results in wipers 220 moving from cleaning lenses 222 of TPS 132 and registration sensors 133.

The above-described movement of each shutter actuator 214 in side-to-side direction D2 (away from the illustrated side frame 206) causes the corresponding shutter-wiper 502 to move in direction D1, and in particular down-to-up direction D1 as viewed in FIGS. 7 and 8), which moves shutter-wiper 502 from the first (closed; FIG. 7) position to the second (open; FIG. 8) position. When shutter-wipers 502 are moved in the second (open) position, shutter-wiper 502 sweeps lenses 131 from contaminants (via brush 812) and uncovers lenses 131 so that printhead 130 is able to participate in a printing operation.

Controller 140 executes program code stored in memory 142 for operating the cleaning and shutter mechanism. According to an example embodiment, controller 140 calls for a cleaning operation each time a predetermined number of pages have been printed, such as every 10,000 pages. In this case, controller 140 causes a cleaning operation to be performed by causing shutter-wiper 502 to move to the first (closed) position and then to move to the second (open) position, or vice versa. Each time shutter-wiper 502 is moved, each brush 812 sweeps across and cleans its corresponding printhead lens 131, and each wiper 220 sweeps across and cleans it corresponding lens 222. Further, controller 140 causes a cleaning operation to occur if a user of imaging device 100 requests a cleaning cycle using the user interface of imaging device 100. Still further, controller 140 causes the shutter-wipers 502 to be in the second (open) position following imaging device 100 being powered. Because shutter-wipers 502 may be closed prior to imaging device 100 being powered down and because shutter-wipers 502 may be closed when being shipped, moving shutter-wipers 502 to the second (open) position soon or immediately after imaging device 100 is powered ensures that printhead 130 is immediately available to participate in a printing operation following the power-up operation.

In accordance with an example embodiment, controller 140 also causes shutter-wiper 502 to move to the first (closed) position if controller 140 anticipates that a developer unit 104 may be removed from and/or a new developer unit 104 inserted into imaging device 100. Removing a developer unit 104 from and/or inserting a new developer unit 104 in its place may cause toner to be leaked onto printhead 130, so controller 140 preemptively closes shutter-wipers 502 in response to anticipating one or more developer units 104 being available for withdrawal. In an example embodiment, the waste toner bottle (not shown) of imaging device 100 must be first removed before any developer unit 104 can be removed, and a cover (not shown) of imaging device 100 must be removed first in order to remove the waste toner bottle, so controller 140 anticipates a developer unit 104 being available for withdrawal upon detecting the cover being opened and the waste toner bottle being removed, and in response moves shutter-wipers 502 to the closed position. Shutter-wipers 502 being in the closed position ensure that any possible toner leakage from a developer unit 104 (being withdrawn from and/or a new developer unit 104 being inserted into imaging device 100) does not accumulate on printhead lenses 131. When controller 140 determines that a waste toner bottle has been installed in imaging device 100 and the cover closed, controller 140 causes shutter-wiper 502 to be moved from the first (closed) position to the second (open) position to allow for printing to occur.

An aspect of this integrated mechanism is to clean all three of the TPS and registration sensor lenses 222 in one action, using a single motor.

The description of the details of the example embodiments have been described in the context of a color electrophotographic imaging devices. However, it will be appreciated that the teachings and concepts provided herein are applicable to multifunction products employing color electrophotographic imaging.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An imaging device, comprising:
   at least one photoconductive member;
   a printhead unit generating at least one light beam, the at least one light beam being incident upon the at least one photoconductive member during a printing operation of the imaging device, the printhead unit comprising at least one exit lens through which the at least one light beam passes before being incident upon the at least one photoconductive member and defining areas of the at least one photoconductive member on which toner develops during the printing operation;
   at least one shutter-wiper member moveable in a first direction between a first position in which the shutter-wiper is positioned over and otherwise covers the at least one exit lens and a second position in which the at least one shutter-wiper does not cover the at least one exit lens so as to allow the at least one light beam to pass therethrough;
   at least one shutter actuator coupled to the at least one shutter-wiper member such that movement of the at least one shutter actuator in a second direction substantially orthogonal to the first direction causes the corresponding shutter-wiper member to move in the first direction; and
   a motion distributor link moveable in the first direction within the imaging device, wherein the at least one shutter actuator is coupled to the motion distribution link such that movement of the motion distribution link in the first direction causes the at least one shutter actuator to move in the second direction.

2. The imaging device of claim 1, wherein the motion distribution link includes at least one cam drive surface and the at least one shutter actuator includes a cam follower for slidingly engaging with the at least one cam drive surface such that movement of the motion distribution link in the first direction causes the at least one shutter actuator to move in the second direction.

3. The imaging device of claim 1, further comprising a waste toner bottle, a cover for covering access to the waste toner bottle, a motor coupled to the motion distribution link, a controller and memory communicatively coupled to the controller, the memory having instructions stored therein for execution by the controller to detect opening of a cover of the imaging device and the waste toner bottle being removed, and, in response to the detection, control the motor to move the motion distribution link in the first direction so as to move the at least one shutter-wiper to the first position relative to the at least one exit lens of the printhead.

4. The imaging device of claim 1, wherein the at least one shutter-wiper member includes a brush member such that movement of the at least one shutter-wiper member between the first and second positions cleans the at least one exit lens of the printhead.

5. The imaging device of claim 1, wherein one of the at least one shutter actuator and the at least one shutter-wiper member includes at least one protrusion which is disposed at an angle between a longitudinal axis and a lateral axis of the one of the at least one shutter actuator and the at least one shutter-wiper member, and the other of the at least one shutter actuator and the at least one shutter-wiper member includes at least one slot which is disposed at an angle for slidingly engaging with the at least one protrusion such that movement of the at least one shutter actuator in the second direction causes the at least one shutter-wiper member to move in the first direction over the at least one exit lens of the printhead.

6. The imaging device of claim 1, further comprising at least one sensor having a protective lens, a wiper housing on which at least one wiper is located, the wiper housing configured to move in the second direction, and a wiper arm coupled between one of the at least one shutter actuator and the wiper housing, the wiper arm pivoting in response to movement of the one of the at least one shutter actuator so as to move the at least one wiper relative to the protective lens of the at least one sensor to clean the protective lens of the at least one sensor.

7. An imaging device, comprising:
   at least one photoconductive member;
   at least one developer unit, the at least one developer unit being adjacent to and cooperating with the at least one photoconductive member to develop toner thereon during a printing operation;
   a printhead unit generating at least one light beam, the at least one light beam being incident upon the at least one photoconductive member during the printing operation of the imaging device, the printhead unit comprising at least one exit lens through which the at least one light beam passes before being incident upon the at least one photoconductive member and defining areas of the at least one photoconductive member on which toner develops during the printing operation;

at least one shutter-wiper member moveable in a first direction between a first position in which the at least one shutter-wiper is positioned over and otherwise covers the at least one exit lens and a second position in which the at least one shutter-wiper does not cover the at least one exit lens so as to allow the at least one light beam to pass through the at least one exit lens;

a motion distributor link disposed in the imaging device and moveable in the first direction within the imaging device; and at least one shutter actuator coupled between the motion distribution link and the at least one shutter-wiper member, such that movement of the motion distribution link in the first direction causes the at least one shutter actuator to move in a second direction in the imaging device generally orthogonal to the first direction.

8. The imaging device of claim 7, wherein the at least one shutter-wiper member includes a brush member such that movement of the shutter-wiper member between the first and second positions cleans the at least one exit lens of the printhead.

9. The imaging device of claim 7, wherein one of the at least one shutter actuator and the at least one shutter-wiper member includes at least one protrusion which is disposed at an angle between a longitudinal axis and a lateral axis of the one of the at least one shutter actuator and the at least one shutter-wiper member, and the other of the at least one shutter actuator and the at least one shutter-wiper member includes at least one slot which is disposed at an angle for slidingly engaging with the at least one protrusion such that movement of the at least one shutter actuator in the second direction causes the at least one shutter-wiper member to move in the first direction over the at least one exit lens of the printhead.

10. The imaging device of claim 8, further comprising at least one sensor having a protective lens, a wiper housing on which at least one wiper is located, the wiper housing configured to move in the second direction, and a wiper arm coupled between one of the at least one shutter actuators and the wiper housing, the wiper arm pivoting in response to movement of the one of the at least one shutter actuators so as to move the at least one wiper relative to the protective lens of the at least one sensor for cleaning the protective lens of the at least one sensor.

11. The imaging device of claim 10, wherein movement of the motion distribution link causes the at least one exit lens and the protective lens of the at least one sensor, to be cleaned simultaneously.

12. The imaging device of claim 7, further comprising a waste toner bottle, a cover for covering access to the waste toner bottle, and a controller with memory having instructions stored therein for execution by the controller to detect opening of a cover of the imaging device and the waste toner bottle being removed, and in response to the detection, moving the motion distribution link in the first direction so as to move the at least one shutter-wiper to the first position.

13. The imaging device of claim 7, wherein the motion distribution link includes at least one cam drive surface and the at least one shutter actuator includes a cam follower for slidingly engaging with the at least one cam drive surface such that movement of the motion distribution link in the first direction causes the at least one shutter actuator to move in the second direction.

14. An imaging device, comprising:

a plurality of photoconductive members;

a plurality of developer units, each developer unit being adjacent to and cooperating with a photoconductive member;

a printhead unit generating a plurality of light beams, each light beam being incident upon a photoconductive member during a printing operation of the imaging device, the printhead unit comprising a plurality of exit lenses through which the plurality of light beams pass before being incident upon the photoconductive members and defining areas of the photoconductive members on which toner develops during the printing operation;

a plurality of shutter-wiper members, each shutter-wiper member being moveable in a first direction between a first position in which each shutter-wiper is positioned over and covers a corresponding exit lens and a second position in which each shutter-wiper is positioned away from and does not cover the corresponding exit lens so as to allow the at least one light beam to pass through the corresponding exit lens;

a plurality of shutter actuators, each shutter actuator coupled to a corresponding shutter-wiper member, such that movement of each shutter actuator in a second direction orthogonal to the first direction causes the corresponding shutter-wiper members to move in the first direction;

at least one sensor having a protective lens;

a wiper housing on which at least one wiper is located, the wiper housing configured to move in the second direction; and a wiper arm coupled between one of the shutter actuators and the wiper housing, the wiper arm pivoting in response to movement of the one of the shutter actuators so as to move the at least one wiper relative to the protective lens of the at least one sensor.

15. The imaging device of claim 14, further comprising a motion distributor link disposed in the imaging device and moveable in the first direction within the imaging device, wherein the each shutter actuator of the plurality of shutter actuators is coupled to the motion distribution link such that movement of the motion distribution link in the first direction causes each shutter actuator to move in the second direction.

16. The imaging device of claim 15, wherein the motion distribution link includes a plurality of cam drive surfaces and each of the plurality of shutter actuators includes a cam follower for slidingly engaging with the each of the plurality of cam drive surfaces such that movement of the motion distribution link in the first direction causes the plurality of shutter actuators to move in unison in the second direction.

17. The imaging device of claim 16, wherein each shutter-wiper member includes a brush member such that movement of the shutter-wiper member between the first and second positions cleans the corresponding exit lens of the printhead, and wherein movement of the one of the shutter actuators causes the wiper housing to move in the second direction so as to simultaneously clean the protective lens of the at least one sensor and the plurality of exit lenses of the printhead unit.

18. The imaging device of claim 14, wherein for each shutter actuator and the corresponding shutter-wiper member, one of the shutter actuator and the shutter-wiper member includes at least one protrusion which is disposed at an angle between a longitudinal axis and a lateral axis of the one of the shutter actuator and shutter-wiper member, and the other of the shutter actuator and shutter-wiper member includes at least one slot which is disposed at an angle for slidingly engaging with the at least one protrusion such that movement of the shutter actuator in the second direction causes the shutter-wiper member to move in the first direction over the corresponding exit lens of the printhead.

19. The imaging device of claim 16, further comprising a waste toner bottle, a cover for covering access to the waste toner bottle, and a controller with memory having instructions executable by the controller to detect opening of a cover of the imaging device and the waste toner bottle being removed, and in response to the detection, to move the motion distribution link in the first direction so as to move the plurality of shutter-wiper members to the first position.

* * * * *